July 14, 1953 — E. F. WELLER, JR., ET AL — 2,645,715
CONSTANT AMPLITUDE SWEEP GENERATOR
Filed Feb. 12, 1951
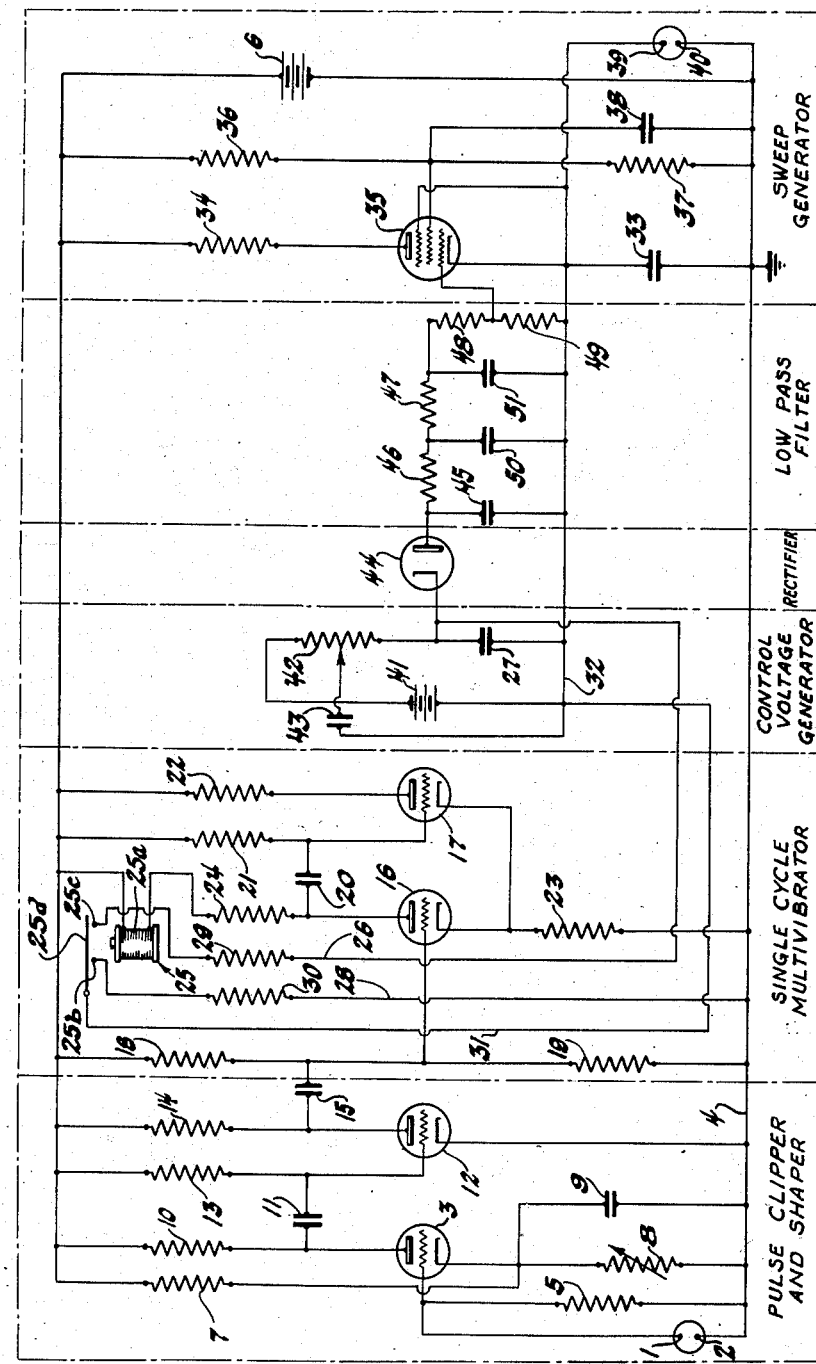
Inventors
Edward F. Weller Jr.
& Richard G. Doyen
By Willits, Helwig & Baillio
Attorneys Patented July 14, 1953

2,645,715

UNITED STATES PATENT OFFICE 2,645,715

CONSTANT AMPLITUDE SWEEP GENERATOR

Edward F. Weller, Jr., Detroit, Mich., and Richard G. Doyen, Milwaukee, Wis., assignors to General Motors Corporation, Detroit, Mich., a corporation of Delaware Application February 12, 1951, Serial No. 210,515

11 Claims. (Cl. 250—27)

This invention relates to a sweep generator, and more particularly to a variable frequency constant amplitude sweep generator.

In making certain tests upon a vehicle engine, as for example, tests of the ignition system or of detonation characteristics, it is often desirable to make the tests under road operating conditions rather than under bench or laboratory conditions. Often symptoms of defective or abnormal engine operation are apparent when the vehicle is being driven on the road, but not apparent under laboratory or bench test conditions. Obviously, when an automobile or other vehicle is operated on the road, the power available for operating test equipment is definitely limited, whereas in a laboratory such power may be unlimited for all practical purposes.

In making tests of the ignition system, detonation characteristics, or the like, a visual indication is often provided by means of an oscilloscope having a sweep which is synchronized with engine speed. Commercially obtainable oscilloscopes are not so constructed that the sweep will be of constant length throughout the range of engine speeds, the variation in sweep length being as great as ninety percent between idling speed and high speed. Consequently, with test equipment of this type, an auxiliary sweep generating circuit preferably is provided for the oscilloscope, this circuit having means for compensating for various engine speeds to provide a substantially constant amplitude sweep throughout the range of engine speed variations.

The present invention provides a novel constant amplitude sweep generator having means for synchronizing the sweep frequency with engine speed or with some other recurring phenomenon, and the circuit is particularly advantageous in that only about half the number of vacuum tubes are required as are required in other circuits of this type which are known to applicants. Therefore the power requirements of the circuit disclosed herein are much less than has in the past been necessary, and the apparatus is particularly adapted for use as a mobile unit in a vehicle where the available power is limited. In the circuit illustrated and described herein, only six tubes are required, and, as will hereinafter appear, only five tubes may be used if desired.

One feature of the invention is that it provides an improved variable frequency constant amplitude sweep generator; another feature of the invention is that it provides a sweep generator having low power requirements so that the generator is particularly adapted for use as a mobile unit, as in testing an automobile engine under road operating conditions; a further feature of the invention is that the circuit includes a relay having normally open contacts connected to the sweep generating condenser, and means are provided for briefly energizing the relay to close the contacts and discharge the condenser; still another feature of the invention is that the circuit includes a single cycle multivibrator having a normally non-conductive tube connected to the source of triggering pulses, the relay coil being connected in the anode circuit of said tube for brief energization upon the occurrence of said pulses; still a further feature of the invention is that a control condenser is provided together with means for charging said condenser to a voltage amplitude dependent upon the repetition rate of the triggering pulses, the voltage of the control condenser being used to regulate the charging rate of the sweep generating condenser as a function of the repetition rate of said triggering pulses; still another feature of the invention is that a second control condenser is provided and is connected to the first control condenser through rectifying means which permit substantial current flow only in the direction of the second control condenser; and an additional feature of the invention is that a low pass filter is connected to the second control condenser for providing a smooth control voltage for regulating the charging rate of the sweep generating condenser.

Other features and advantages will be apparent from the following description, and from the drawing which is a schematic diagram of an operative circuit incorporating the invention.

In the drawing the various operating sections of the circuit are separated by broken lines. Pulses having a repetition rate dependent upon the speed of the engine under test are obtained from the engine under test and are applied to the input circuit of a pulse clipper and shaper, and the triggering pulses developed in this circuit are used to trigger a single cycle multivibrator which controls a relay. Brief energization of the relay upon the occurrence of each triggering pulse causes the normally open contacts of the relay to close briefly so that the sweep generating condenser which is connected to these contacts discharges at the repetition rate of the pulses to synchronize the sweep with engine speed. The closure of the contacts also causes the discharge of a first control condenser at the repetition rate of the triggering pulses. This control condenser is connected to a second control condenser through a rectifier which isolates the second control condenser from the discharge circuit so that the voltage amplitude across the second condenser is a function of the repetition rate of the triggering pulses. The second condenser is connected through a filter to the control grid of a tube to regulate the charging rate of the sweep generating condenser as a function of the repetition rate of the triggering pulses.

The circuit has input terminals 1 and 2, terminal 1 being connected to the control grid of a triode 3 and terminal 2 being connected to a common lead 4, which may be grounded if desired. The control grid of the triode 3 is connected to ground through a grid leak resistor 5, which may have a value of 240,000 ohms. The cathode of the triode 3 is connected between the B-plus supply (here shown as a battery 6 which may have an output of 300 volts) and ground through a voltage divider comprising a resistor 7, which may have a value of 150,000 ohms, and an adjustable resistor 8, which may have a maximum value of 10,000 ohms. The cathode resistance portion 8 of the voltage divider is by-passed in conventional manner by a condenser 9, which may have a value of .001 microfarad. The anode of the triode 3 is connected to B-plus through a resistor 10, which may have a value of 150,000 ohms, and the signal output of the output triode 3 is coupled through a condenser 11, which may have a value of .001 microfarad, to the control grid of a triode 12. The control grid of the triode 12 is also connected to B-plus through a resistor 13, which may have a value of 1 megohm; the cathode is connected directly to ground; and the anode is connected to B-plus through a resistor 14, which may have a value of 150,000 ohms.

The triodes 3 and 12 comprise a pulse clipper and shaper, the output pulses of which are of substantially constant amplitude. In the event the source of triggering pulses is a spark pickup associated with the high tension lead of one spark plug of a multi-cylinder engine, the triode 3 acts as a threshold amplifier and eliminates low amplitude pulses from other cylinders. Adjustment of the resistor 8 may set the threshold at any desired amplitude.

The recurring voltage pulses developed in the anode circuit of the triode 12 are applied through a coupling condenser 15, which may have a value of .001 microfarad, to the control grid of the input triode 16 of a single cycle multivibrator comprising triodes 16 and 17. This multivibrator circuit is so designed that the triode 16 is normally non-conducting, while the triode 17 is normally conducting. A positive bias for the control grid of the triode 16 is provided by a voltage divider comprising resistances 18 and 19, which may have values of 300,000 ohms and 100,000 ohms respectively. The anode of the triode 16 is coupled to the control grid of the triode 17 through a condenser 20 which may have a value of .002 microfarad, and a positive bias for the control grid of triode 17 is obtained through a B-plus connection including a resistor 21, which may have a value of 1 megohm. The anode of the triode 17 is connected to B-plus through a resistor 22, which may have a value of 10,000 ohms. The cathodes of triodes 16 and 17 are connected together, and a common connection is made to ground through a resistor 23, which may have a value of 12,000 ohms.

The anode of the normally non-conductive triode 16 is connected to B-plus through a circuit including resistor 24, which may have a value of 22,000 ohms, connected in series with the operating coil 25a of a relay 25 having stationary contacts 25b and 25c each adapted to close with a movable contact 25d. The contacts are normally open. The stationary contact 25c is connected by means of a lead 26 to one side of a first control condenser 27, which may have a value of 1 microfarad, and the stationary contact 25b is connected by means of a lead 28 to ground. The leads 26 and 28 respectively incorporate resistors 29 and 30 which may each have a value of 25 ohms and which limit the current flowing through the relay contacts to prevent welding of the contacts. The movable contact 25d is connected through a lead 31 to a lead 32 which in turn is connected to the ungrounded side of a sweep generating condenser 33, which may have a value of 40 microfarads.

The sweep generating condenser 33 is connected to a charging circuit including the battery 6, a resistor 34, which may have a value of 25,000 ohms, and current control means comprising a pentode 35. The cathode of the tube 35 is connected directly to the sweep generating condenser 33 as illustrated, and the suppressor grid of the tube is connected to the cathode. The screen grid of the tube is connected to B-plus by means of a voltage divider comprising resistors 36 and 37 having values of 40,000 and 80,000 ohms respectively. A screen by-pass to ground is provided by a condenser 38 which may have a value of 16 microfarads.

As is well understood in the art, a pentode tube is a constant current device since current flow through the tube is substantially independent of the anode voltage thereof throughout a wide range. Consequently, the condenser 33 charges at a substantially constant rate through the tube 35 to provide a linear sweep. When a positive pulse from the pulse clipper and shaper circuit is applied to the grid of the tube 16, this tube is rendered briefly conductive as the single cycle multivibrator goes through a cycle of operation. During the brief time which tube 16 conducts, relay coil 25a is energized and the contacts of the relay are closed. Closure of contacts 25b and 25d causes the sweep generating condenser 33 to discharge through leads 32 and 31, contacts 25d, 25b, and lead 28 to ground. When the multivibrator completes its cycle of operation, tube 16 again becomes non-conductive, the relay coil is deenergized and the relay contacts open, disconnecting the condenser discharge circuit so that the condenser again starts to charge at a linear rate through the tube 35. As is well understood in the art, the condenser does not charge fully during each cycle of operation, and the sweep voltage represents only a small portion of the charging curve of the condenser. The output sweep voltage from the condenser 33 may be taken from output terminals 39 and 40 and applied to the horizontal deflection plates of an oscilloscope. Controlling the triggering of the sweep generating condenser by means of a sensitive, fast operating relay cuts down the number of vacuum tubes utilized in the circuit and minimizes the power requirements of the circuit, making it more advantageous for use as a mobile unit.

In order to provide a sweep of constant amplitude at different engine speeds, a control voltage circuit including the condenser 27 is utilized. The condenser 27 is connected into a charging circuit comprising a battery 41 and a resistor or potentiometer 42. The battery 41 may have an output of 45 volts and has its negative terminal connected to the potentiometer 42, which may have a value of 100,000 ohms. A condenser 43 is connected between the positive terminal of the battery and the movable potentiometer tap to aid in obtaining a constant amplitude sweep by improving the control of the peak voltage developed across condenser 27 throughout the range of engine speed. The negative side of condenser 27 is connected to relay contact 25c and the positive side is connected to relay contact 25d through leads 32 and 31, so that this condenser is also discharged when the relay is energized. As in the case of the sweep generating condenser, the control condenser 27 charges only partially during each cycle, and the peak voltage developed thereacross at the time of discharge is a function of the repetition rate of the triggering pulses. The negative side of condenser 27 is also connected to the cathode of a diode rectifier 44, the anode of which is connected to one side of a second control condenser 45, the other side of which is connected to the lead 32. The anode of the diode 44 is also connected to a low-pass filter comprising resistors 46, 47, 48 and 49 and condensers 50 and 51. These resistors may have respective values of 500,000 ohms, 500,000 ohms, 2.8 megohms and 3.4 megohms. The condensers 45, 50 and 51 may each have a value of .25 microfarad. The mid-point between resistors 48 and 49 is connected to the control grid of the tube 35.

In the operation of the control circuit, the condenser 27 partially charges from the battery 41 and it is discharged upon energization of the relay 25. The amplitude of the charge varies directly with the rate of repetition of the triggering pulses. Because the negative side of this condenser is connected to the cathode of the diode 44, said cathode is negative with respect to the diode anode during the charging cycle and current flows through the diode to charge the condenser 45 to the peak voltage of the condenser 27. However, upon discharge of the condenser 27 the diode isolates the condenser 45 from the discharge circuit so that the peak voltage is maintained across the condenser 45 and is applied to the control grid of the tube 35 to regulate the rate of charge of the sweep generator condenser 33.

While the rectifier 44 is herein illustrated as a diode, it will be obvious that a cold rectifier may be substituted in place thereof further to reduce the number of tubes and the power requirements of the circuit. However, a diode is advantageous in that it permits no reverse current flow and has almost negligible resistance to current flow toward the condenser 45. On the other hand, many cold rectifiers have a resistance of the order of 1000 ohms in the direction of current flow and 100,000 ohms in the reverse direction. Such an arrangement would add to the ripple voltage. Even in the circuit illustrated some ripple is present, although this ripple is greatly reduced by the low-pass filter. The filter is constructed to have a time constant which is several times as long as the repetition rate of the triggering pulses at the slowest engine speed so that the control bias voltage at the grid of the tube 35 is relatively free from cyclic variation and is substantially constant. However, when the sweep rate changes the control voltage stabilizes within a few sweep periods.

Obviously the circuit is so designed that neither the condenser 33, the condenser 27, nor the condenser 45 charges fully between triggering pulses. The condensers 33 and 27 are discharged when they are only partially charged so that voltages obtained thereacross are substantially linear.

While we have shown and described one embodiment of our invention, it is subject to many modifications. Changes, therefore, in the construction and arrangement may be made without departing from the spirit and scope of the invention as set forth in the appended claims.

We claim:

1. A constant amplitude sweep generator of the character described, including: a sweep generating condenser; a control condenser; charging circuit means connected to said condensers; means for developing recurring triggering voltage pulses; means for discharging both said condensers upon the occurrence of said pulses; and a circuit connecting said control condenser to the sweep generating condenser charging circuit means to regulate the charging rate of said sweep generating condenser as a function of the repetition rate of said pulses.

2. A variable frequency sweep generator of the character described, including: a sweep generating condenser; a charging circuit connected to said condenser; a constant current device in said circuit; a control condenser; a charging circuit connected to said control condenser; means for developing recurring triggering voltage pulses of variable frequency; means for discharging both said condensers upon the occurrence of said pulses; and a circuit connecting said control condenser to the sweep generating condenser charging circuit means to regulate the charging rate of said sweep generating condenser as a function of the repetition rate of said pulses.

3. A constant amplitude sweep generator of the character described, including: a sweep generating condenser; a charging circuit connected to said condenser; current control means in said circuit; means for developing recurring triggering voltage pulses; a control condenser; a charging circuit connected to said control condenser; means for discharging both of said condensers before they are fully charged upon the occurrence of said pulses; and a circuit connecting said control condenser to said current control means to regulate the charging rate of said sweep generating condenser as a function of the repetition rate of said pulses.

4. A constant amplitude sweep generator of the character described, including: a sweep generating condenser; a charging circuit connected to said condenser; current control means in said circuit; means for developing recurring triggering voltage pulses; a first control condenser; a charging circuit connected to said control condenser; means for discharging both of said condensers before they are fully charged upon the occurrence of said pulses; a second control condenser; rectifying means connected between said first and second control condensers, said rectifying means permitting substantial current flow only in the direction of said second control condenser; and a circuit connecting said second control condenser to said current control means to regulate the charging rate of said sweep generating condenser as a function of the repetition rate of said pulses.

5. A constant amplitude sweep generator of the character described, including: a sweep generating condenser; a charging circuit connected to said condenser; current control means in said circuit; means for developing recurring triggering voltage pulses; a first control condenser; a charging circuit connected to said control condenser; means for discharging both of said condensers before they are fully charged upon the occurrence of said pulses; a second control condenser; rectifying means connected between said first and second control condensers, said rectifying means permitting substantial current flow only in the direction of said second control condenser; a circuit connecting said second control condenser to said current control means to regulate the charging rate of said sweep generating condenser as a function of the repetition rate of said pulses; and a filter in said last mentioned circuit.

6. Apparatus of the character claimed in claim 5, wherein said filter has a time constant which is long compared with the repetition rate of said pulses.

7. A constant amplitude sweep generator of the character described, including: a sweep generating condenser; a charging circuit connected to said condenser; a tube in said circuit having a control element; means for developing recurring triggering voltage pulses; a first control condenser; a charging circuit connected to said control condenser; means for discharging both of said condensers before they are fully charged upon the occurrence of said pulses; a second control condenser; rectifying means connected between said first and second control condensers, said rectifying means permitting substantial current flow only in the direction of said second control condenser; a circuit connecting said second control condenser to the control element of said tube to regulate the charging rate of said sweep generating condenser as a function of the repetition rate of said pulses; and a low-pass filter in said last mentioned circuit, said filter having a time constant which is several times as long as the repetition rate of said pulses.

8. Apparatus of the character claimed in claim 7, including control means in said tube whereby the current flow through said tube is substantially independent of the anode voltage thereof throughout a wide range.

9. A variable frequency constant amplitude sweep generator of the character described, including: a sweep generating condenser; a charging circuit connected to said condenser; current control means in said circuit; means for developing recurring triggering voltage pulses; a control condenser; a charging circuit connected to said control condenser; a relay having normally open contacts connected to said condensers; means for briefly energizing said relay upon the occurrence of said pulses to close said contacts and discharge both of said condensers before they are fully charged; and a circuit connecting said control condenser to said current control means to regulate the charging rate of said sweep generating condenser as a function of the repetition rate of said pulses.

10. A variable frequency constant amplitude sweep generator of the character described, including: a sweep generating condenser; a charging circuit connected to said condenser; current control means in said circuit; means for developing recurring triggering voltage pulses; a first control condenser; a charging circuit connected to said control condenser; a relay having an operating coil and having normally open contacts connected to said condensers; electronic switching means connected to said pulse developing means for briefly energizing said relay upon the occurrence of said pulses to close said contacts and discharge both of said condensers before they are fully charged; a second control condenser; rectifying means connected between said first and second control condensers, said rectifying means permitting substantial current flow only in the direction of said second control condenser; and a circuit connecting said second control condenser to said current control means to regulate the charging rate of said sweep generating condenser as a function of the repetition rate of said pulses.

11. A variable frequency constant amplitude sweep generator of the character described, including: a sweep generating condenser; a charging circuit connected to said condenser; a tube in said circuit having a control element, said tube having the characteristic that the current flow therethrough is substantially independent of the anode voltage thereof throughout a wide range; means for developing recurring triggering voltage pulses; a first control condenser; a charging circuit connected to said control condenser; a relay having an operating coil and having normally open contacts connected to said condensers; a single cycle multivibrator having a normally non-conductive tube connected to said pulse developing means, said coil being connected in the anode circuit of said tube for brief energization upon the occurrence of said pulses to close said contacts and discharge both of said condensers after they are only partially charged; a second control condenser; rectifying means connected between said first and second control condensers, said rectifying means permitting substantial current flow only in the direction of said second control condenser; a circuit connecting said second control condenser to the control element of said tube to regulate the charging rate of said sweep generating condenser as a function of the repetition rate of said pulses; and a low-pass filter in said last mentioned circuit, said filter having a time constant which is several times as long as the repetition rate of said pulses.

EDWARD F. WELLER, Jr.
RICHARD G. DOYEN.

References Cited in the file of this patent

UNITED STATES PATENTS

| Number | Name | Date |
|---|---|---|
| 2,410,920 | Atwood | Nov. 12, 1946 |
| 2,489,312 | Pacini | Nov. 29, 1949 |
| 2,519,413 | Taylor | Aug. 22, 1950 |
| 2,554,172 | Custin | May 22, 1951 |
| 2,562,188 | Hance | July 31, 1951 |